(12) United States Patent
Dearing et al.

(10) Patent No.: US 9,432,084 B2
(45) Date of Patent: Aug. 30, 2016

(54) TESTABLE MODULAR AUDIO VIDEO DATA WALL PLATE

(71) Applicant: Leviton Manufacturing Co., Inc., Melville, NY (US)

(72) Inventors: Mark Edward Dearing, Bothell, WA (US); John L. Seger, Bothell, WA (US); Ross Goldman, Bothell, WA (US); Charles Bragg, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 222 days.

(21) Appl. No.: 14/212,501

(22) Filed: Mar. 14, 2014

(65) Prior Publication Data

US 2014/0269350 A1   Sep. 18, 2014

Related U.S. Application Data

(60) Provisional application No. 61/793,600, filed on Mar. 15, 2013.

(51) Int. Cl.
| | |
|---|---|
| *H04B 3/56* | (2006.01) |
| *H02G 3/18* | (2006.01) |
| *H02G 3/04* | (2006.01) |
| *H04B 3/54* | (2006.01) |
| *H04Q 1/06* | (2006.01) |

(52) U.S. Cl.
CPC .............. *H04B 3/56* (2013.01); *H02G 3/0456* (2013.01); *H02G 3/18* (2013.01); *H04B 3/542* (2013.01); *H04Q 1/06* (2013.01)

(58) Field of Classification Search
USPC ..................... 174/50; 439/535, 719
See application file for complete search history.

(56) References Cited

U.S. PATENT DOCUMENTS

| | | | | |
|---|---|---|---|---|
| 5,645,449 | A * | 7/1997 | Sabo ........................ | H02G 3/18 439/536 |
| 7,057,105 | B2 * | 6/2006 | Gottardo ................ | H01R 13/74 174/495 |
| 2008/0108249 | A1 * | 5/2008 | Carman ................. | H01R 13/73 439/535 |

* cited by examiner

*Primary Examiner* — Dhirubhai R Patel
(74) *Attorney, Agent, or Firm* — Amin, Turocy & Watson, LLP

(57) ABSTRACT

A testable modular audio, video, data low voltage box is provided. A low voltage box can receive cabling and terminate the cabling within the low voltage box creating a telecommunications Industry Association (TIA) permanent link that is fully testable. Modular faceplates can be interfaced with the low voltage box providing varying types of output ports. The modular faceplates are removable and replaceable.

14 Claims, 10 Drawing Sheets

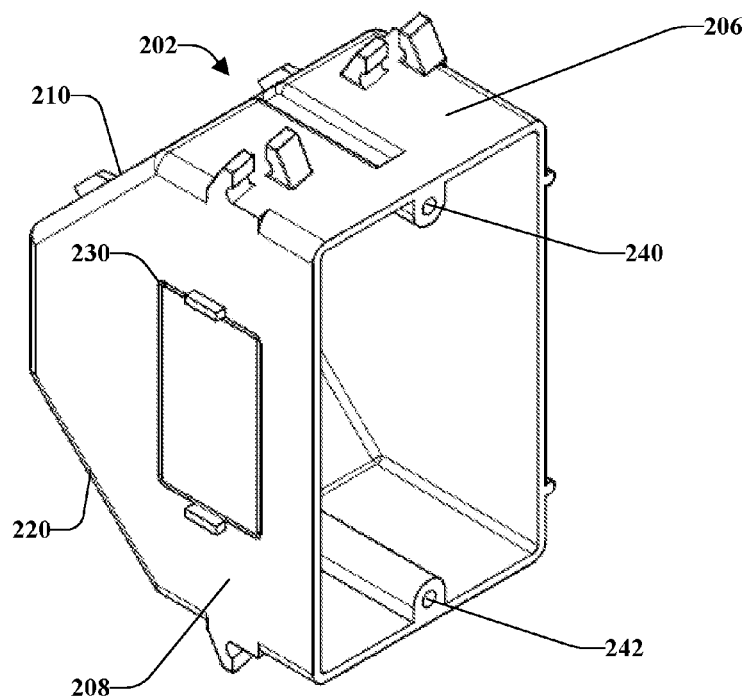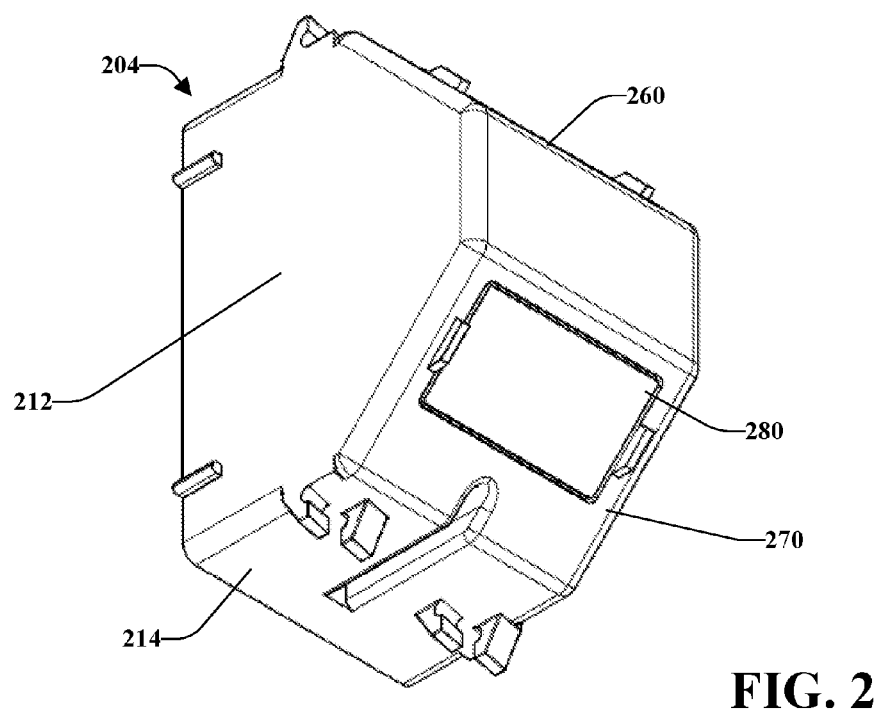
FIG. 2

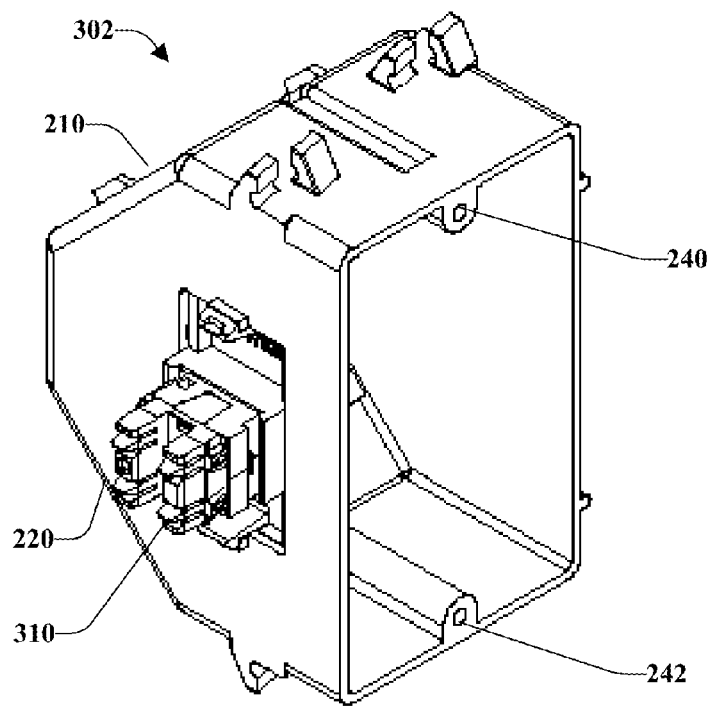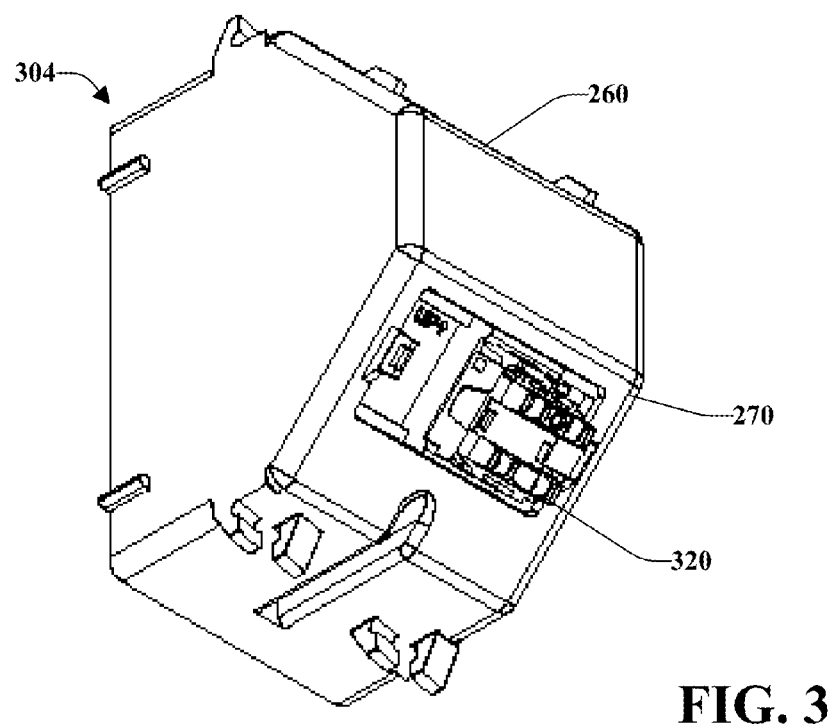
FIG. 3

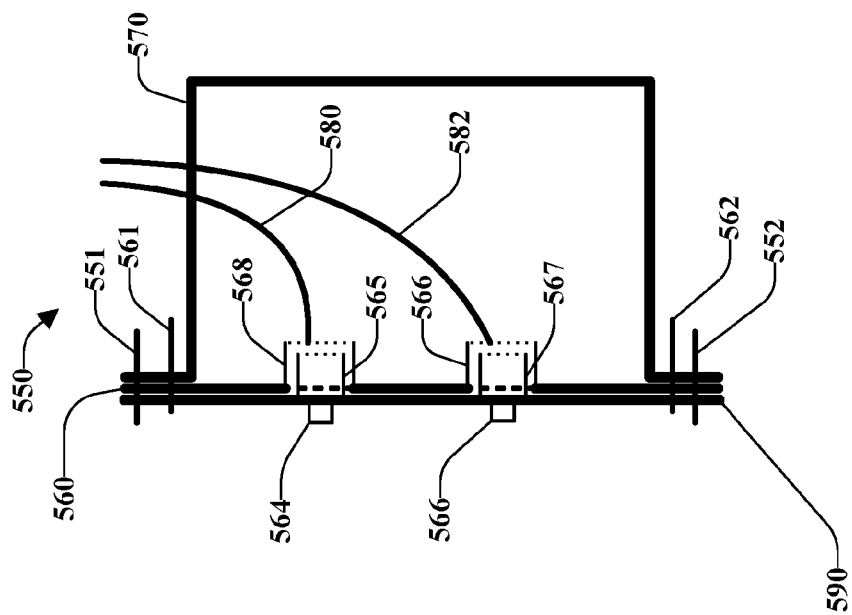
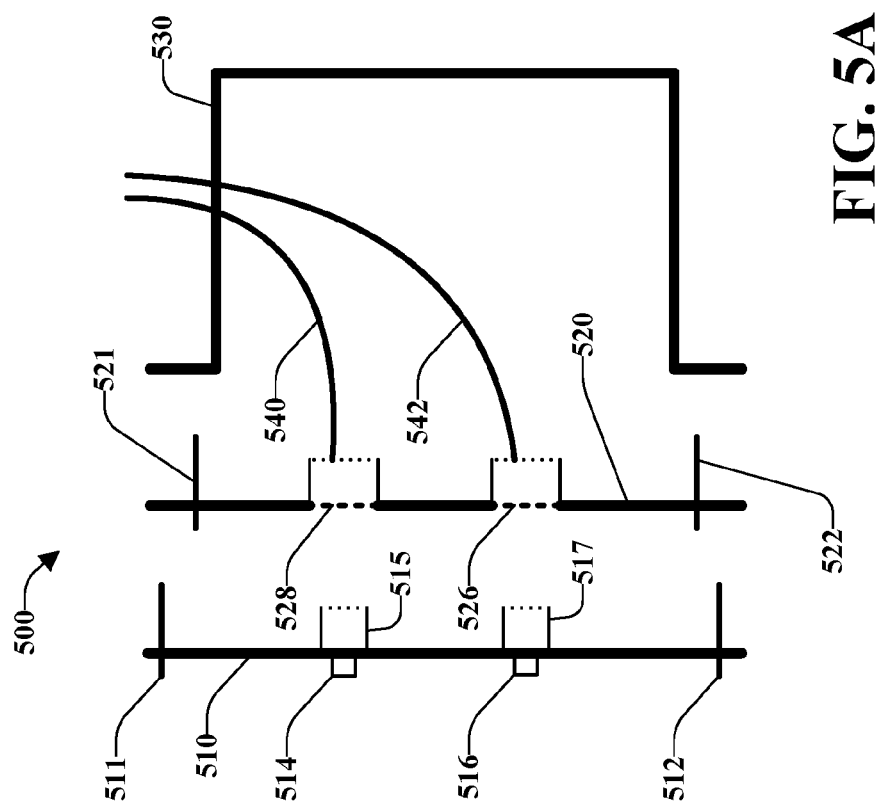

TESTABLE MODULAR AUDIO VIDEO DATA WALL PLATE

CROSS-REFERENCE TO RELATED APPLICATIONS

This application claims priority to U.S. Provisional Application Ser. No. 61/793,600, filed on Mar. 15, 2013, and entitled "TESTABLE MODULAR AUDIO VIDEO DATA WALL PLATE," the entirety of which is incorporated by reference.

TECHNICAL FIELD

The disclosed subject matter relates to audio, video, and data housings and, more particularly, to testable modular external housings.

BACKGROUND

Using the space inside of a wall to house cabling while providing an external faceplate for connectors is often more aesthetically pleasing than running cable loose on the ground or other exterior to the wall locations. By running cabling inside a wall, the cabling can be protected from modification, severing, or other interference or damage that can result when a cable is exposed to both the elements and the prying hands of people. Conventional audio and video housings comprise a low voltage work box capable of receiving cabling through an interior or exterior wall cavity and a faceplate that receives the cable on the interior of the faceplate and provides a jack or a port on the exterior of the faceplate for interfacing with audio systems, video systems, data systems, etc.

In most systems, the cable received by the low voltage work box corresponds directly with the exterior port on the faceplate. For example, if the exterior faceplate provided for an RCA port, then an RCA cabling would be received through the low voltage work box and connected to the interior of the faceplate. As technology evolves, audio, video, and data signal standards can change. Using the example of the RCA cabling and port, which propagates an analog signal, if an end user wished to change the port into a digital port, such as a High-Definition Multimedia Interface ("HDMI") port, they would likely need to replace the internal wall cabling and the faceplate to effectuate the change. Rerunning cabling through an existing wall can be both costly and time consuming.

In still other systems, after initially running cabling through a wall, testing the operation of the cable can prove problematic. For example, analog signals propagated using analog cabling may not be as easy to test as digital signals propagated using digital cabling, such as Category Cabling. Newly run cable infrastructure can be tested using standards such as the Telecommunications Industry Association ("TIA") permanent link topology; however, the ability to fully test the cable using industry standards can directly depend on the type of cable that is run.

The above-described deficiencies of conventional audio, video, and data housings, systems, and methods is merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to a cable management assembly. In an embodiment, a cable management assembly can include a low voltage work box that can receive a set of category cabling carrying sets of data packets into a set of modular jacks. The set of modular jacks can be testable for at least data packet receipt. A faceplate can be comprised of a set of external jacks and a set of internal jacks. The set of internal jacks can interface with the set of modular jacks to transmit the sets of data packets to the set of external jacks.

In a further embodiment, a method comprises receiving a set of category cabling carrying sets of data packets into a low voltage box, wherein category cabling of the set of category cabling are terminated into a set of jacks. The method then comprises testing the set of jacks for receipt of the sets of data packets. The method then describes interfacing the set of jacks with a set of internal jacks on a faceplate, wherein the faceplate has complementary geometry with the low voltage box. The method then describes directing data packets received by the set of internal jacks on the faceplate to a set of external jacks on the faceplate.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 2 illustrates side views of example angled modular low voltage boxes without cabling reception modules in accordance with aspects of the subject disclosure;

FIG. 3 illustrates side views of example angled modular low voltage boxes with cabling reception modules in accordance with aspects of the subject disclosure;

FIGS. 5A and 5B illustrate side views of an example low voltage box with modular faceplates in accordance with aspects of the subject disclosure;

DETAILED DESCRIPTION

Figure 1:
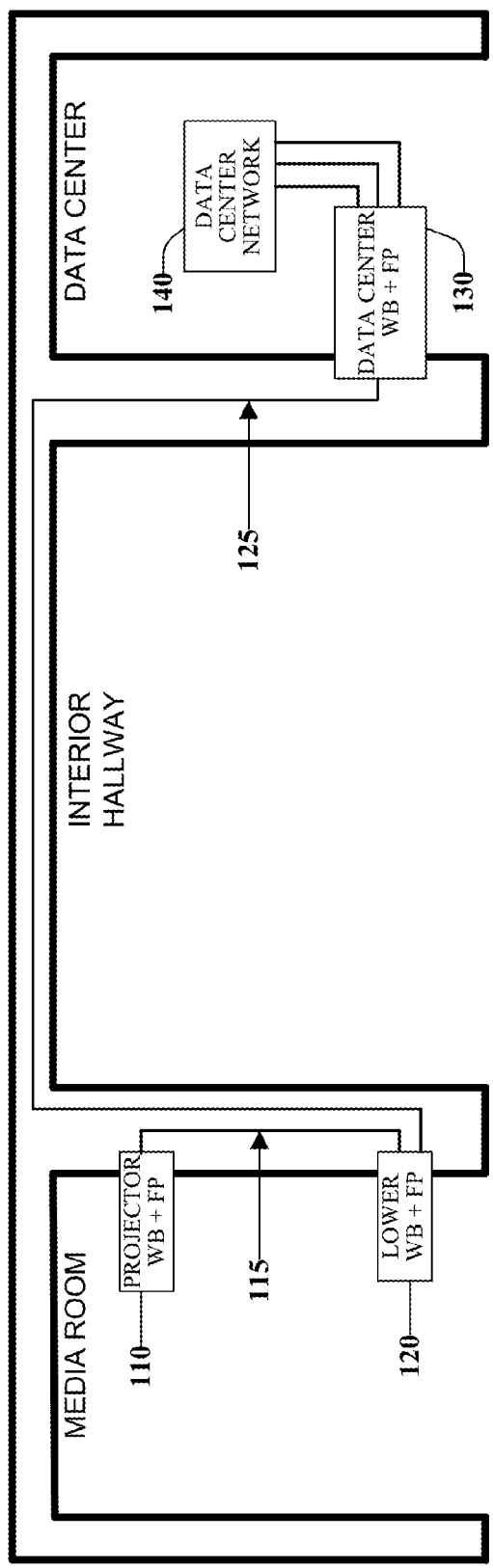
FIG. 1 is an illustration of example audio/video/data wiring infrastructure in an existing building.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Use of low voltage work boxes or low voltage boxes is ubiquitous. Low voltage boxes provide for recessed mounting of electrical cabling, communications cabling, audio/visual cabling, etc. Installed within a recessed cavity of a wall, the low voltage boxes can receive cabling that is run within the cavity of wall, e.g., between two wall studs. Work boxes may be mounted to studs as part of the original construction or mounted to drywall after construction. Some work boxes are in the form of open straps while others may create a fully enclosed area. In most implementations, faceplates are installed which provide external connectors for easy user access to the type of signal being propagated through the cabling. For example, a faceplate can contain a HDMI port allowing a user to plug in a commercially available HDMI cord into the port while then connecting the opposite end of the HDMI cord into audio visual equipment.

Referring now to FIG. 1, there is illustrated an illustration of example audio/video/data wiring infrastructure in an existing building. In this basic illustration, a media room contains a wall mounted projector located at a much higher vertical height than the audio/visual source which contains the data to be projected. For example, the user of the media room may desire to have access to a media player at a height comfortable for the easy insertion and ejection of physical media. However, the projector that will physically display the media may function best when located at or near the ceiling. In this example, a user could run cabling, such as RCA cabling, from the projector to the media player external to the wall; however, by locating the cabling exterior to the wall, it will be visible and exposed to potential tampering or even severing. In FIG. 1, a lower work box and face plate 120 can be installed at or near the location of the media player. In addition, a projector work box and faceplate 110 can be installed at or near the location of the projector. Using the cavity within the wall, likely a space between two wall studs, the cabling 115 can be run between projector work box 110 and lower work box 120.

One means of installation would be to run actual RCA cable between projector work box 110 and lower work box 120. RCA faceplates could then be installed on both the projector work box 110 and the lower work box 120 that provide an external RCA port on both faceplates. The user then could use RCA cords to link the lower RCA port to the media player and the projector RCA port to the projector. However, after installation, if a user switched media players to a unit that is not capable of outputting media via an RCA port, the user's options may be limited. For example, if the new media player requires a HDMI connection, there may not be any available options to send a digital HDMI signal over the existing RCA cable within the wall. In such an example, it may require the user to rerun cable capable of propagating a HDMI signal through the wall bridging the projector work box and faceplate 110 and the lower work box and faceplate 120.

Systems and methods disclosed herein provide for using a TIA permanent link infrastructure when linking two work boxes. Cabling, such as Category cabling, capable of propagating a digital signal can be run between work boxes. By using category cable or other cabling capable of propagating digital signals, an upgrade path from analog to digital signals can be ensured without the need to later replace or rerun cabling. For example, category cabling bridging two work boxes can be terminated within the work boxes and then linked to an external port on the faceplate to provide connection to a myriad of different connectors, including future connectors not currently in use. In the example above, had category cabling been used to link projector work box and faceplate 110 with lower work box and faceplate 120, it is likely that the user would not have to rerun cabling if they desire to change to a media source reliant on HDMI signals. In this example, the RCA port faceplate can be removed and replaced by a HDMI port faceplate that is capable of interfacing with the category cable bridging the two work boxes. It can be appreciated that this modular design of faceplates capable of interfacing with category cable, in one example, provides a flexible and inexpensive way to change connector types without rerunning cable within a wall.

In another example, lower work box and faceplate 120 is also connected to data center network 140 via cabling 125 and data center work box and faceplate 130. Cabling 125 is run through the wall, through an interior ceiling space above an interior hallway, finally ending in an interior wall within the data center. In this example, the benefits for modular designing of faceplates is apparent as the longer the run, the likely more expensive and time consuming it will be to rerun cabling.

In addition to flexibility that a modular system provides, using cabling, such as category cabling, can give a technician or installer the ability to fully test the fixed portion of cabling infrastructure to industry standards regardless of the type of audio, video, or data signal being propagated by the cabling.

A wiremap test can ensure that wire pairs are correctly connected in order to ensure signal continuity and verify other transmission requirements. A propagation delay test can test the time required for a signal to travel the full length of the link. Using the measured time and the speed of signal propagation native to the cabling, a length of the cabling can be calculated. For example, the nominal velocity of propagation value inherent to the cable provides the speed with which electrical signal travel within the cabling. Attenuation can also be tested as a linear function of cable length.

Another test can measure crosstalk. As category cabling provides for information to be exchanged in both directions, crosstalk measures the amount of crosstalk from opposite traveling signals that are appearing within the measured signal. For example, near-end crosstalk and far-end crosstalk reflect the amount of crosstalk on the transmitter side and the receiver side respectively.

Return loss can also be measured and tested. Return loss measures the amount of reflected energy on each wire pair of a link. It can be appreciated that many cabling implementations require full duplex transmissions over all wire pairs simultaneously. A change of impedance along a wire pair can cause a reflection of some amount of the signal energy back in the direction of the transmission. It can be appreciated that mismatches between cabling, mismatches between cabling and hardware, presence of patch cords, or other anomalies may be apparent from return loss measurements.

It is to be appreciated that the previously mentioned tests are not an exclusive list of tests that can be performed, and that, conceivably, any testing related to the functionality of the cabling or other network infrastructure can be effectuated using the TIA Permanent Link topology.

Referring now to FIG. 2, there are illustrated side views of example angled modular low voltage boxes without cabling reception modules in accordance with aspects of the subject disclosure. Low voltage boxes 202 and 204 are substantially the same shape, with a top surface 206, a bottom surface 214, a left surface 208, a right surface 212, an angled rear bottom surface (220 and 270 respectively) and an angled rear top surface (210 and 260 respectively). Low voltage box 202 provides for a side cable receptacle 230 whereas low voltage box 204 provides for an angled rear bottom cable receptacle 280. It can be appreciated that side cable receptacle 230 can be placed on the opposite side in alternate implementations to provide an easy means of installation. For example, in the event the low voltage box was attached to a stud on the side of cable receptacle 230, it would be more advantageous to have the cable receptacle be located on the opposite side of the low voltage box. In one implementation, the low voltage box is capable of being installed in either direction allowing the user to position the side of the cable receptacle. It can be appreciated that in a similar manner, low voltage box 204 can be rotated to provide cable receptacle 280 to be positioned in a rear top position as well. It can be further appreciated that by placing the cable receptacle on the side or at an angle, it can be assured that the allowable depth of the wall cavity, e.g., the stud width, is not exceeded. As depicted on low voltage box 202, screw holes 240 and 242 are provided for attachment of a faceplate of complementary geometry.

Referring now to FIG. 3, there are illustrated side views of example angled modular low voltage boxes with cabling reception modules in accordance with aspects of the subject disclosure. Low voltage box 302 contains an external data connector 310 for receiving cabling, such as category cabling. Low voltage box 304 comprises a similar external data connector 320 capable of receiving cabling, such as category cabling. In one implementation, external data connectors 310 and 320 can be terminated to accept RJ-45 plugs. It can be appreciated that other types of external connectors can be used that can accept other category cabling plugs or other cabling plugs used as the permanent link.

Figure 4:
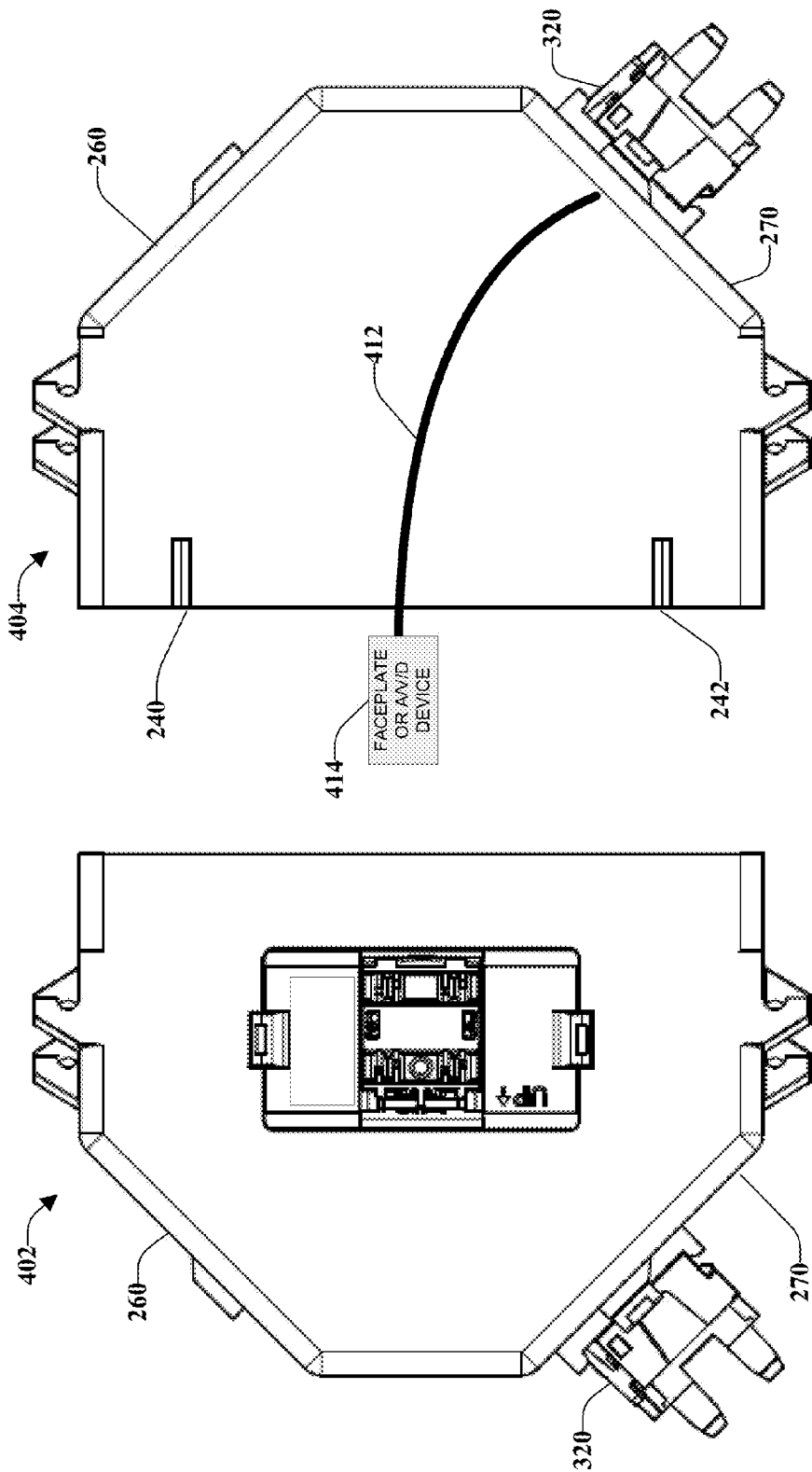
FIG. 4 illustrates side views of example angled modular low voltage boxes with cabling reception modules and received cabling in accordance with aspects of the subject disclosure.

Referring now to FIG. 4, there are illustrated side views of example angled modular low voltage boxes with cabling reception modules and received cabling in accordance with aspects of the subject disclosure. Low voltage box 402 contains both a rear lower external data connector 320 as well as a side cable receptacle not currently in use. It can be appreciated that low voltage boxes can be constructed that provide receptacles in both locations allowing the installer to choose the most advantageous placement for the external data connector.

Low voltage box 404 depicts patch cord 412 connected to data connector 320. It can be appreciated that data connector 320 can be configured to provide for both receiving category cable that is part of the permanent link from within the wall and also provide a plug internal to low voltage box 404 for receiving a patch cord. Patch cord 412 can then interface with a faceplate 414. Faceplate 414 can function similarly to multimedia faceplate 510 as more fully described below with respect to FIGS. 5A and 5B. It can be appreciated that multiple patch cords 412 can be present and interface with multiple patch cord connectors on a faceplate to provide for additional ports on the exterior of the faceplate.

In one implementation, patch cord 412 can interface with an Audio Visual or Data ("A/V/D") device directly. For example, if a device is to be surface mounted on the wall, it may be advantageous to mount the device directly over the low voltage box without a faceplate. In such an example, the low voltage box can provide the depth to allow for slack storage of patch cord 412. The link from data connector 320 to the opposite side of the permanent link, e.g., the media source if low voltage box 404 is used to feed a projector, is fully testable. It can be appreciated that as the permanent link is exterior to low voltage box 404, maintenance of the connector and installation of the patch cord or replacement patch cords can be effectuated easily after the low voltage box is properly installed.

FIGS. 5A and 5B are respective first and second side views of an example low voltage box with modular faceplates in accordance with aspects of the subject disclosure. The modular faceplate and low voltage box are depicted separate from each other at 500. The modular faceplate and low voltage box are depicted fully assembled at 550.

At 500, low voltage box 530 can receive a set of cabling (540 and 542) through an interior wall cavity. The ends of cabling 540 and 542 can be terminated by RJ-45 connectors 528 and 526 respectively, where the RJ-45 connector terminations are integrated within data faceplate 520. Data faceplate 520 can be attached to low voltage box 530 via screw 521 and 522. In one implementation, data faceplate 520 can provide data connections via the integrated RJ-45 connectors. It can be appreciated that RJ-45 connectors 528 and 526 are fully testable using TIA permanent link topology for data packet receipt, wire mapping, propagation delay, crosstalk, or return loss.

In other implementations, varying types of multimedia faceplates 510 can be interfaced to data faceplate 520. For example, in FIG. 5, multimedia faceplate 510 comprises RJ-45 plugs 515 and 517 that can directly interface with RJ-45 connectors 528 and 526. Multimedia faceplate can be attached to low voltage box 530 and data faceplate 520 using screws 511 and 512. External ports 514 and 516 of the multimedia faceplate are depicted as RCA ports; however, it can be appreciated that additional multimedia faceplates can be provided that share RJ-45 plugs 515 and 517 respectively allowing them to interface with data faceplate 520. The types of outputs on multimedia faceplate 510 can include a 8P8C jack, a 6P6C jack, a 6P4C jack, a 4P4C jack, a HDMI jack, an optical jack, a RCA jack, a banana jack, a s-video connector, a 3.5 mm stereo adapter, a DisplayPort, a DVI port, a VGA port, or a wire binding post.

In one implementation, data faceplate 520 and multimedia faceplate 510 can be integrated into a single faceplate providing a set of interior internal jacks that receive cabling 540 and 542 and a set of external jacks 514 and 516 capable of propagating the signal carried over cabling 540 and 542.

At 550, low voltage box 570 is fully assembled to data faceplate 560 and multimedia faceplate 590 respectively. Screws 551, 561, 552 and 562 can secure the multimedia faceplate and data faceplate to low voltage box 570. RJ-45 plugs 565 and 567 interface directly with RJ-45 connectors 566 and 568. In this sense, it can be appreciated that multimedia faceplate 590 is of complementary geometries with data faceplate 560. External ports 564 and 566 are depicted as RCA ports; however, as referenced above, a variety of ports can be implemented using multimedia faceplate 590. In one implementation, a replacement faceplate can comprise a replacement set of external jacks and a replacement set of internal jacks where the replacement set of internal jacks interface with the set of modular jacks to transmit the sets of data packets to the replacement set of external jacks. Screws 561 and 562 can be removed allowing for removal of multimedia faceplate 590 while data faceplate 560 remains attached to low voltage box 570 via screws 551 and 552. In this sense, a user could attain varying types of replacement multimedia faceplates with a plurality of possible outputs, and then have an easy means to adjust the types of ports used to output the data received over cabling 580 and 582.

In another implementation, low voltage work boxes 530 and 570 respectively can be mounted to an interior wall cavity using at least one of screw and nail installation or flip up ear installation. It can be appreciated that screw and nail installation may be more beneficial in a new construction or renovation situation where the interior of the wall cavity is exposed, e.g., not containing drywall. It can be further appreciated that the flip up ear installation provides for low voltage boxes to remain in place by the ears securing themselves to the drywall, plaster, paneling, etc. that may surround the low voltage box. In most flip up ear installations, a drywall saw can be used to cut a hole in drywall or plaster just large enough to fit the low voltage box, which can then be inserted into the sawed hole, and the flip up ears activated to secure the low voltage box within the newly cut hole in the drywall or plaster.

In one implementation, a multimedia faceplate can contain converter electronics that can convert analog or digital media to a digital signal suitable for transmission over cabling 540, 542, 580 and 582 respectively. The digital signal can then be converted back into an analog signal or other audio, video, or data signal at the second end of the TIA permanent link. It can be appreciated that the external connectors related to opposite ends of a TIA permanent link do not need to match. For example, one end of the TIA permanent link can receive a signal using a VGA port and the opposite end of the link can output the signal via an external DisplayPort. In some implementations, the multimedia faceplate can receive power from the media source device to aid in signal conversion.

Figure 6:
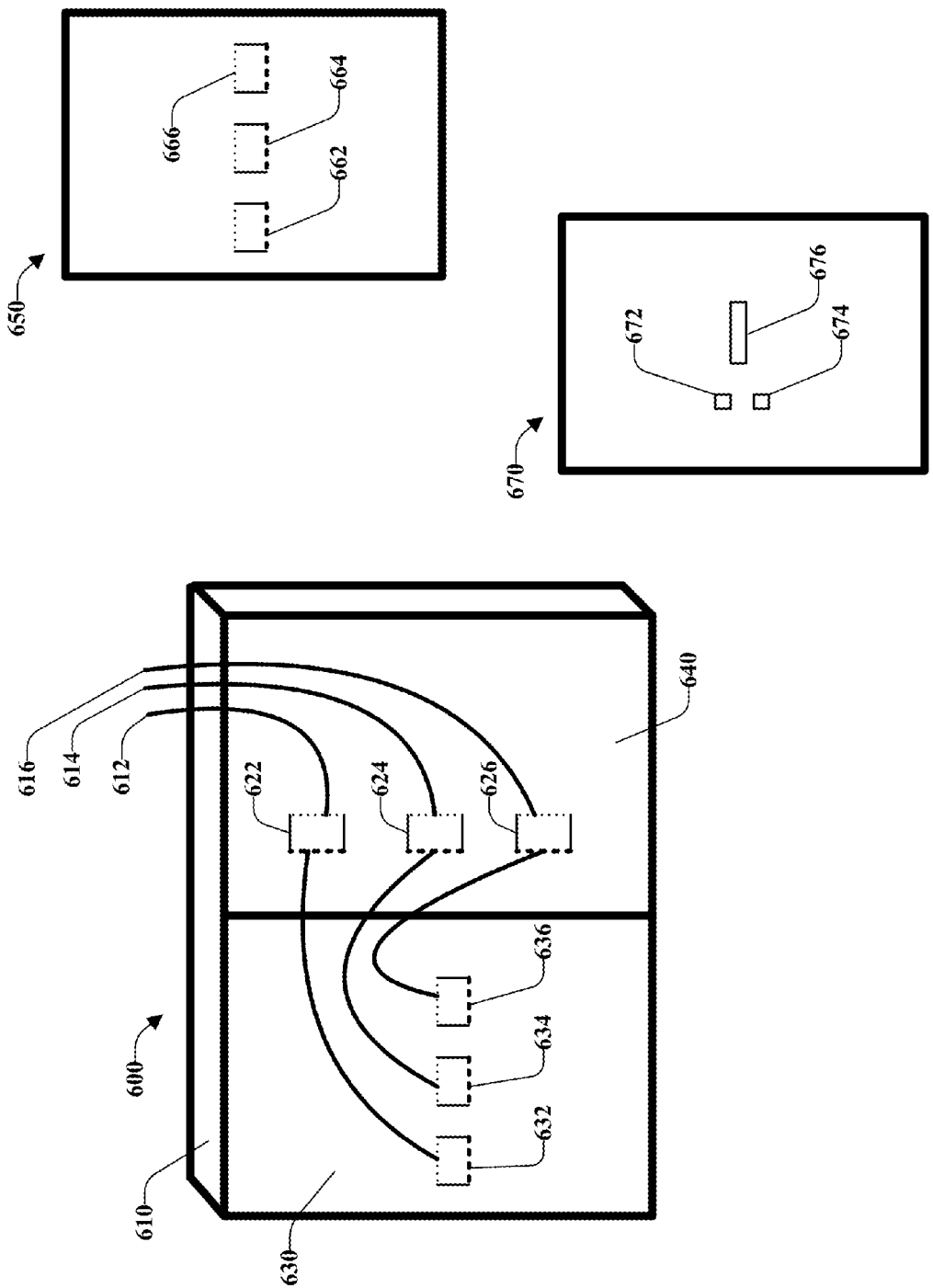
FIG. 6 illustrates example views of a dual gang low voltage box and associated modular faceplates in accordance with aspects of the subject disclosure.

Referring now to FIG. 6, there are illustrated example views of a dual gang low voltage box and associated modular faceplates in accordance with aspects of the subject disclosure. Dual gang low voltage box 610 can contain a first half 640 and a second half 630. In the first half, 640, a set of cabling (612, 614, and 616) can be received. The cabling can be terminated by connectors, for example, RJ-45 connectors, 622, 624, and 626, in the first half 640. It can be appreciated that at the point of connectors 622, 624 and 626 respectively, a TIA permanent link is established providing for a fully testable cabling run. Patch cords can link connectors 622, 624 and 626 with RJ-45 ports 632, 634, and 636 respectively in the second half 630 of dual gang low voltage box 610.

An interior view 650 and an exterior view 670 of a faceplate are depicted capable of interfacing with the second half 630 of dual gang low voltage box 610. The interior side 650 of the faceplate has complementary geometries with the second half 630 of low voltage box 610 allowing interior faceplate ports 662, 664, 666 to interface directly with RJ-45 ports 632, 634, and 636. Similar to the multimedia faceplate in FIGS. 5A and 5B, the exterior side 670 of the depicted faceplate can contain varying types of ports. As depicted, the exterior side 670 comprises a pair of RCA ports 672 and 674 along with an HDMI port 676. It can be appreciated that other types of ports can be provided including but not limited to an 8P8C jack, a 6P6C jack, a 6P4C jack, a 4P4C jack, a HDMI jack, an optical jack, a RCA jack, a banana jack, a s-video connector, a 3.5 mm stereo adapter, a DisplayPort, a DVI port, a VGA port, or a wire binding post.

It can be appreciated that by using a dual gang work box, a shallow dual gang work box can be used. In some situations, a shallow single box may not have enough depth and corresponding interior space to fit the necessary cabling and connectors to establish a TIA permanent link. A shallow dual gang box as depicted at 600 can house TIA permanent link connectors in the first half 640, while providing patch cord links to the second half 630 capable of interfacing with a faceplate.

Figure 7:
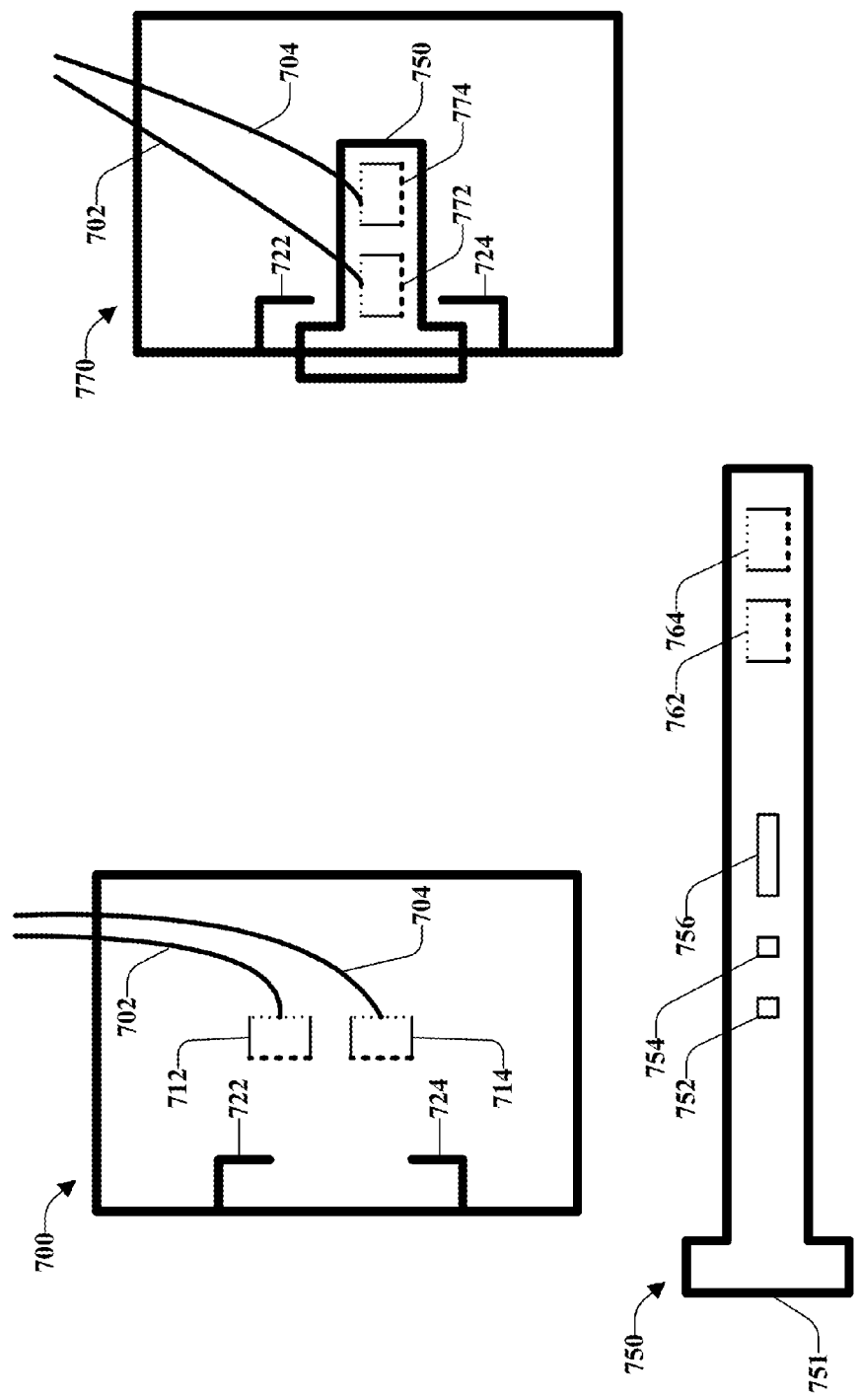
FIG. 7 illustrates example views of a low voltage box incorporating a modular strap in accordance with aspects of the subject disclosure.

Referring now to FIG. 7, there are illustrated example views of a low voltage box incorporating a modular strap configured to be concealed within a wall cavity or pulled out from the wall cavity to permit access to connectors situate within the strap in accordance with aspects of the subject disclosure. Low voltage box 700 can receive a set of cabling 702 and 704 terminated by RJ-45 connectors 712 and 714 respectively. A TIA permanent link can be established at connectors 712 and 714 providing a fully testable permanent link cabling run. Snap fit posts 722 and 724, integrated within low voltage box 700, provide a means to accept flexible strap 750. Flexible strap 750 can contain a plurality of output ports (752, 754, 756) along with a set of ports (762, 764) capable of interfacing with the TIA permanent links 702 and 704. A handle 751 can be provided that can interact with snap fit posts 722 and 724. For example, the strap can be retractable where the handle 751 prevents the retractable strap 750 from retracting past snap fit posts 722 and 724. In one implementation, flexible strap 750 can be made from plastic with a thin piece of stamped metal capable of holding bonds near the ports on the strap. The strap can also be fully removable allowing replacement straps to be inserted that contain varying output ports. For example, an output port on the strap can include a 8P8C jack, a 6P6C jack, a 6P4C jack, a 4P4C jack, a HDMI jack, an optical jack, a RCA jack, a banana jack, a s-video connector, a 3.5 mm stereo adapter, a DisplayPort, a DVI port, a VGA port, or a wire binding post. In one implementation, at least one output jack can retract within the wall cavity.

Completed flexible strap and low voltage box assembly 770 depicts cabling 702 and 704 interfaced directly with the flexible strap at 772 and 774. Output ports, for example 752, 754, and 756, are not visible but are within the interior of low voltage box 770. It can be appreciated that the flexible strap acts as a faceplate, and an additional faceplate, such as a faceplate that conceals the inside of the low voltage box, is not required for functionality. For example, if a device is to be surface mounted on the wall, it may be advantageous to mount the device directly over the low voltage box and strap assembly 770. In such an example, the low voltage box can provide the depth to allow for slack storage of patch cords necessary to connect output ports 752, 754 and 756 to the A/V/D device.

In one implementation, a safety valve can be implemented within handle 751 that prevents full retraction of flexible strap 750. For example, a plastic peg, or a section of tie wrap or twine can be integrated within a safety valve for efficient operation of the flexible strap. It can be appreciated that low voltage box 700 can contain no backing to the interior of the wall, allowing the strap to retract within the wall cavity itself outside the low voltage box. It can be further appreciated that preventing the flexible strap from retracting within the interior of the wall cavity is advantageous as it may be difficult and/or costly to locate a flexible strap that is lost within a wall cavity.

In another implementation, flexible strap 750 can be used with any bulkhead (feedthrough) connectors to connect several connectors within a wall. For example, a low voltage work box and flexible strap can receive feedthrough connectors, such as an RCA cable/connector or an HDMI cable/connector, and interface the feedthrough connectors directly to a set of output ports, e.g., 752, 754 and 756. In such an implementation, modular ports 762 and 764 are not present or utilized within flexible strap 750.

Figure 8:
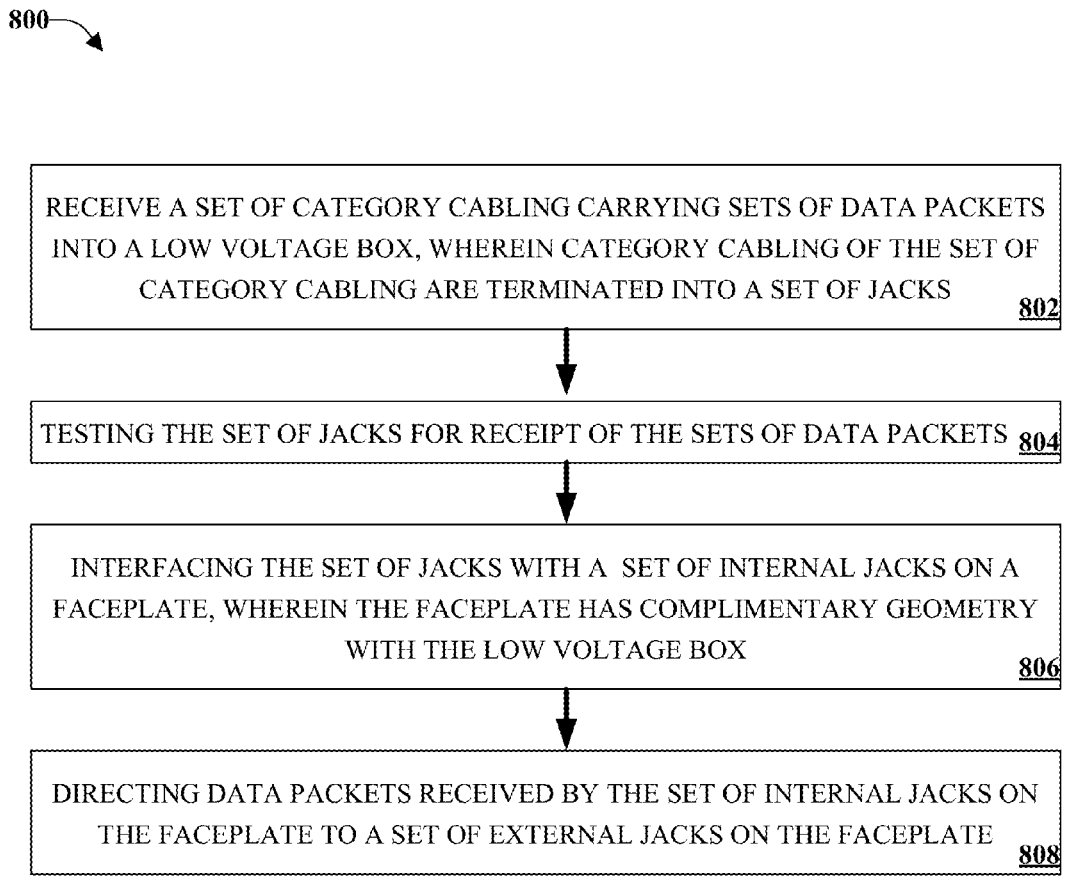
FIG. 8 illustrates an example method for receiving, testing, interfacing and directing sets of data packets using a modular low voltage box in accordance with aspects of the subject disclosure.
Figure 9:
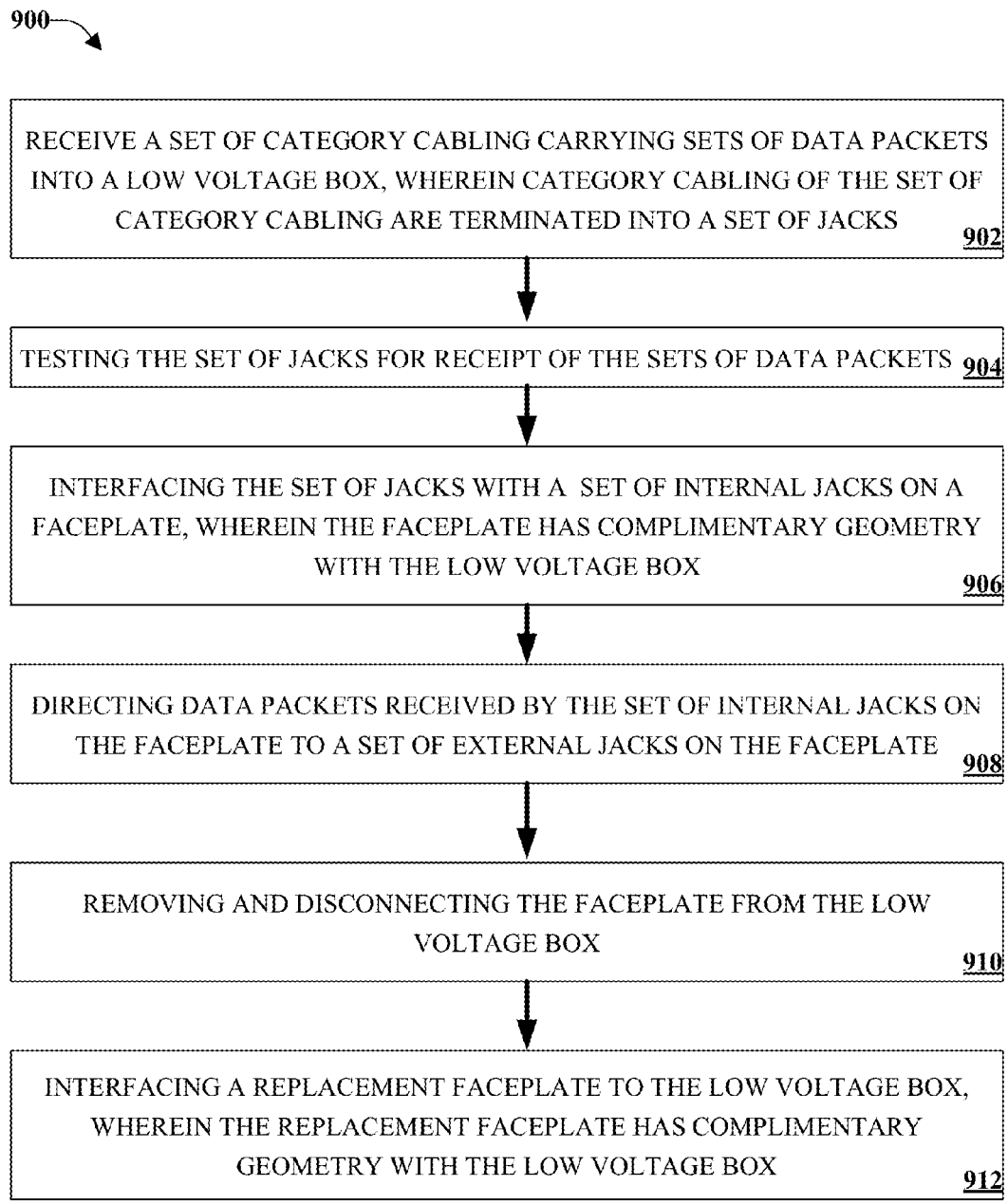
FIG. 9 illustrates an example method for receiving, testing, interfacing and directing sets of data packets using a modular low voltage box, including removing and interfacing a replacement faceplate in accordance with aspects of the subject disclosure.
Figure 10:
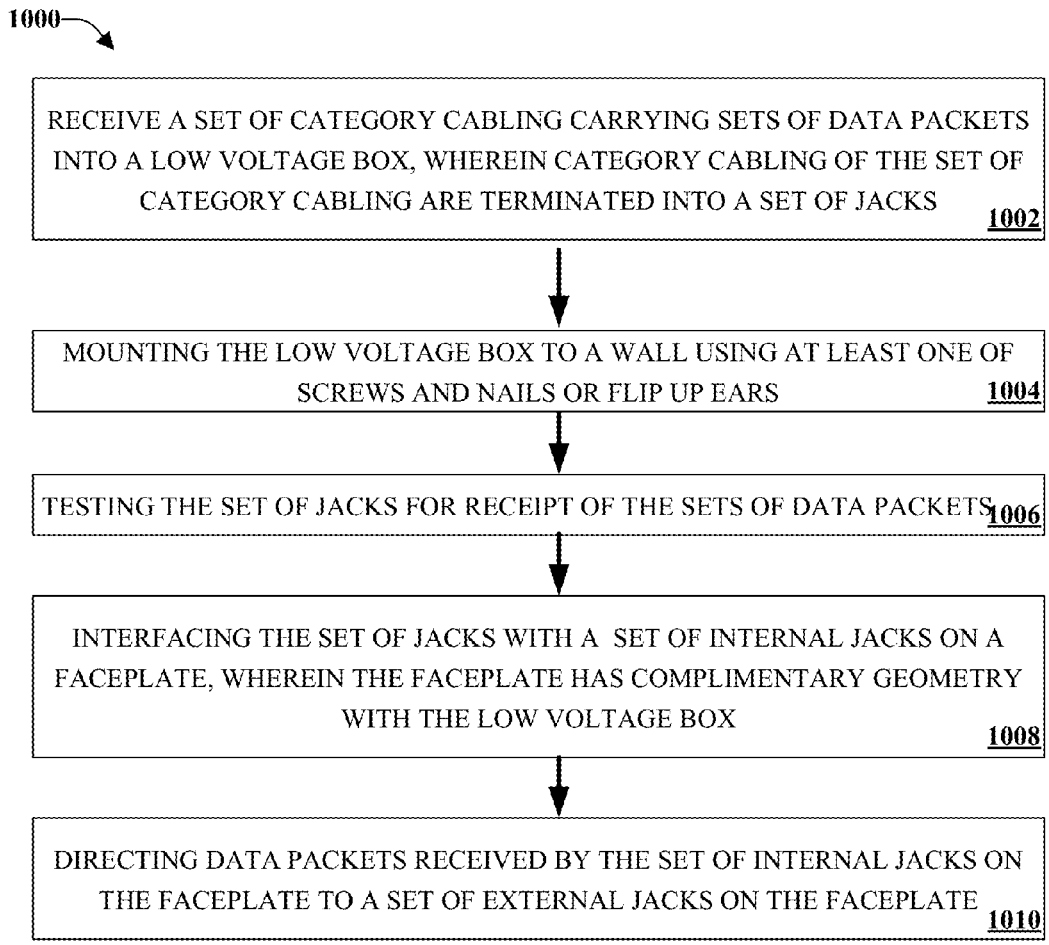
FIG. 10 illustrates an example method for receiving, testing, interfacing and directing sets of data packets using a modular low voltage box, including mounting the low voltage box in accordance with aspects of the subject disclosure.

FIGS. 8-10 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 8 illustrates an example method 800 for receiving, testing, interfacing and directing sets of data packets using a modular low voltage box in accordance with aspects of the subject disclosure. At 802, a set of category cabling carrying sets of data packets can be received into a low voltage box, wherein category cabling of the set of category cabling is terminated into a set of jacks. At 804, the set of jacks can be tested for at least receipt of data packets. In one implementation, the testing can include a wiremap test, a propagation delay test, a crosstalk test, or a return loss test. At 806, the set of jacks can be interfaced with a set of internal jacks on a faceplate, wherein the faceplate has complementary geometry with the low voltage box. In one implementation, interfacing the set of jacks with the set of internal jacks can be accomplished using a patch cord. At 808, data packets received by the internal jacks on the faceplate can be directed to a set of external jacks on the faceplate. In one implementation, the set of external jacks comprise at least one of a 8P8C jack, a 6P6C jack, a 6P4C jack, a 4P4C jack, a HDMI jack, an optical jack, a RCA jack, a banana jack, a s-video connector, a 3.5 mm stereo adapter, a DisplayPort, a DVI port, a VGA port, or a wire binding post.

FIG. 9 illustrates an example method 900 for receiving, testing, interfacing and directing sets of data packets using a modular low voltage box, including removing and interfacing a replacement faceplate in accordance with aspects of the subject disclosure. At 902, a set of category cabling carrying sets of data packets can be received into a low voltage box, wherein category cabling of the set of category cabling is terminated into a set of jacks. At 904, the set of jacks can be tested for at least receipt of data packets. At 906, the set of jacks can be interfaced with a set of internal jacks on a faceplate, wherein the faceplate has complementary geometry with the low voltage box. At 908, data packets received by the internal jacks on the faceplate can be directed to a set of external jacks on the faceplate.

At 910, the faceplate can be removed and disconnected from the low voltage box. At 912, a replacement faceplate can be interfaced to the low voltage box, wherein the replacement faceplate has complementary geometry with the low voltage box.

FIG. 10 illustrates an example method 1000 for receiving, testing, interfacing and directing sets of data packets using a modular low voltage box, including mounting the low voltage box in accordance with aspects of the subject disclosure. At 1002, a set of category cabling carrying sets of data packets can be received into a low voltage box, wherein category cabling of the set of category cabling is terminated into a set of jacks. At 1004, the low voltage box can be mounted to a wall using at least one of screws and nails or flip up ears. At 1006, the set of jacks can be tested for at least receipt of data packets. At 1008, the set of jacks can be interfaced with a set of internal jacks on a faceplate, wherein the faceplate has complementary geometry with the low voltage box. At 1010, data packets received by the internal jacks on the faceplate can be directed to a set of external jacks on the faceplate.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A cable management assembly, comprising:
   a low voltage work box comprising a top surface, a bottom surface, at least one rear surface adjacent to the top surface and the bottom surface, a left surface, a right surface, and an opening opposite the at least one rear surface;
   a data faceplate configured to mount to the low voltage work box over the opening;
   a data faceplate connector installed on the data faceplate, wherein a first side of the data faceplate connector is configured to interface with a cable on a rear side of the data faceplate;
   a multimedia faceplate configured to mount over the data faceplate;
   a first internal plug installed on a rear side of the multimedia faceplate, the first internal plug configured to interface with a second side of the data faceplate connector on a front side of the data faceplate while the multimedia faceplate is mounted over the data faceplate; and
   a first external port installed on a front side of the multimedia faceplate, the first external port comprising an audio/visual port configured to exchange signaling with the first internal plug.

2. The cable management assembly of claim 1, wherein the data faceplate is of complementary geometry to the low voltage work box.

3. The cable management assembly of claim 1, wherein the low voltage work box is a dual gang work box, and is configured to receive the cable in a first half of the low voltage work box.

4. The cable management assembly of claim 1, wherein the external port comprises at least one of a 8P8C jack, a 6P6C jack, a 6P4C jack, a 4P4C jack, a high-definition multimedia interface (HDMI) jack, an optical jack, a Radio Corporation of America (RCA) jack, a banana jack, a s-video connector, a 3.5 mm stereo adapter, a DisplayPort, a digital video interface (DVI) port, a video graphics array (VGA) port, or a wire binding post.

5. The cable management assembly of claim 1, wherein the low voltage box is mountable to a wall using at least one of screw installation, a nail installation, or a flip up ear installation.

6. The cable management assembly of claim 1, wherein the multimedia faceplate is a first multimedia faceplate and is removable from the data faceplate, and the cable management assembly further comprises:
   a second multimedia faceplate comprising a second external port installed on a front side of the second multimedia faceplate and a second internal plug installed on a rear side of the second multimedia faceplate, wherein the second external port corresponds to a different audio/visual format relative to the external port, and the second internal plug is configured to interface with the second side of the data faceplate connector on the front side of the data faceplate while the second multimedia faceplate is mounted over the data faceplate.

7. The cable management assembly of claim 1, wherein the at least one rear surface comprises an angled top rear surface and an angled bottom rear surface, and
   the cable management assembly further comprises a data connector installed in the angled bottom rear surface, wherein the data connector provides an interface for a first cable plug on an external side of the low voltage work box and for a second cable plug on an internal side of the work box.

8. The cable management assembly of claim 7, wherein the data connector is recessed behind the wall while the low voltage box is mounted to the wall.

9. The cable management system of claim 7, wherein the cable is a patch cord having a first end connected to the data connector and a second end connected to the data connector.

10. The cable management assembly of claim 9, wherein the data connector interfaces with the first side of the data faceplate connector via the patch cord.

11. The cable management assembly of claim 1, further comprising conversion electronics installed in the multimedia faceplate and configured to convert a digital signal received at the first internal plug to an A/V signal protocol of the A/V port, and to convert an A/V signal received at the A/V port to a digital format of the first internal plug.

12. A method, comprising:
   mounting a data faceplate over a low voltage box, the low voltage box comprising a top surface, a bottom surface, at least one rear surface adjacent to the top surface and the bottom surface, a left surface, a right surface, and an opening opposite the at least one rear surface, wherein the mounting comprises mounting the data faceplate over the opening;
   connecting a cable to a first side of a data faceplate connector installed on the data faceplate;
   mounting a first multimedia faceplate over the data faceplate, wherein the mounting causes a first internal plug installed on a rear side of the first multimedia faceplate to interface with a second side of the data faceplate connector on a front side of the data faceplate;
   connecting a first audio/visual (A/V) connector attached to an A/V cable to a first external port installed on a front side of the first multimedia faceplate; and
   exchanging signaling between the A/V cable and the cable, wherein the exchanging comprises exchanging the signaling via the first external port, the first internal plug, and the data faceplate connector.

13. The method of claim 12, further comprising:
   removing the first multimedia faceplate from the low voltage box, wherein the removing causes the first internal plug installed on the rear side of the first multimedia faceplate to disconnect from the second side of the data faceplate connector on the front side of the data faceplate; and
   mounting a second multimedia faceplate to the low voltage box, wherein the second multimedia faceplate has geometry that is complementary to the low voltage box, and the mounting causes a second internal plug installed on a rear side of the second multimedia faceplate to interface with the second side of the data faceplate connector on the front side of the data faceplate; and connecting a second A/V connector to a second external port installed on a front side of the second multimedia faceplate, wherein the second A/V connector and the second A/V port support a different A/V signal protocol relative to the first A/V connector and the first external port.

14. The method of claim 12, further comprising:

converting, by conversion electronics installed in the first multimedia faceplate, a digital signal received at the first internal plug to an A/V signal protocol of the first external port; and converting, by the conversion electronics, an A/V signal received at the first external port to a digital format of the first internal plug.

* * * * *